United States Patent
Matsumoto

(10) Patent No.: US 10,698,075 B2
(45) Date of Patent: Jun. 30, 2020

(54) MOBILE-TERMINAL DETECTION APPARATUS AND MOBILE-TERMINAL DETECTION METHOD

(71) Applicant: DENSO CORPORATION, Kariya, Aichi-pref. (JP)

(72) Inventor: Munenori Matsumoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/455,827

(22) Filed: Jun. 28, 2019

(65) Prior Publication Data

US 2019/0317181 A1    Oct. 17, 2019

Related U.S. Application Data

(63) Continuation of application No. PCT/JP2017/042934, filed on Nov. 30, 2017.

(30) Foreign Application Priority Data

Jan. 18, 2017    (JP) .................................. 2017-006599

(51) Int. Cl.
| | |
|---|---|
| H04W 4/00 | (2018.01) |
| G01S 5/02 | (2010.01) |
| G01S 5/06 | (2006.01) |
| H04W 64/00 | (2009.01) |
| H01Q 1/00 | (2006.01) |
| H01Q 13/20 | (2006.01) |

(52) U.S. Cl.
CPC .............. *G01S 5/0294* (2013.01); *G01S 5/06* (2013.01); *H04W 64/003* (2013.01); *H01Q 1/007* (2013.01); *H01Q 13/203* (2013.01)

(58) Field of Classification Search
CPC ...... G01S 5/0294; G01S 5/06; H04W 64/003; H01Q 1/007; H01Q 13/203
See application file for complete search history.

(56) References Cited

U.S. PATENT DOCUMENTS

| | | | | |
|---|---|---|---|---|
| 5,329,576 A | * | 7/1994 | Handforth | H04B 7/26 379/55.1 |
| 5,838,279 A | * | 11/1998 | Duffett-Smith | G01S 5/0009 342/459 |
| 6,234,428 B1 | * | 5/2001 | Bachtiger | B61L 3/225 246/7 |

(Continued)

FOREIGN PATENT DOCUMENTS

| | | |
|---|---|---|
| JP | 2003248045 A | 9/2003 |
| JP | 5873926 B2 | 3/2016 |

*Primary Examiner* — Charles T Shedrick
(74) *Attorney, Agent, or Firm* — Harness, Dickey & Pierce, P.L.C.

(57) ABSTRACT

A mobile-terminal detection apparatus that detects a location of a mobile terminal inside a vehicle cabin is provided. The mobile-terminal detection apparatus is configured to receive the radio wave through an interior antenna disposed inside the vehicle cabin; receive the radio wave through a leaky cable disposed inside the vehicle cabin; detect a time difference between a timing of reception of the radio wave from the mobile terminal through the interior antenna and a timing of reception of the radio wave through the leaky cable; and detect, based on the time difference, the location of the mobile terminal relative to a path over which the leaky cable is laid.

10 Claims, 16 Drawing Sheets

(56) References Cited

U.S. PATENT DOCUMENTS

| | | | |
|---|---|---|---|
| 9,244,148 B1* | 1/2016 | Sternowski | G01S 5/0221 |
| 2004/0185910 A1* | 9/2004 | Matsushita | H01Q 13/203 |
| | | | 455/562.1 |
| 2004/0219930 A1* | 11/2004 | Lin | G01S 5/02 |
| | | | 455/456.1 |
| 2007/0285233 A1* | 12/2007 | Inomata | G01S 13/04 |
| | | | 340/552 |
| 2009/0081947 A1* | 3/2009 | Margis | H04B 7/18508 |
| | | | 455/3.02 |
| 2014/0171113 A1* | 6/2014 | Christmann | G01S 5/06 |
| | | | 455/456.1 |
| 2015/0171510 A1* | 6/2015 | Hirose | H01Q 1/3241 |
| | | | 343/713 |
| 2018/0241420 A1* | 8/2018 | Nakano | H01Q 1/2291 |
| 2019/0179035 A1* | 6/2019 | Gernot | G01S 19/50 |

* cited by examiner

TABLE A

| TIME DIFFERENCE | 0~t1 | t1~t2 | t2~t3 | t3~t4 | t4~t5 | t5~t6 | t6~t7 | t7~t8 | t8~t9 |
|---|---|---|---|---|---|---|---|---|---|
| MOBILE TERMINAL LOCATION | A | B | C | D | E | F | G | H | I |

TABLE B

| TIME DIFFERENCE | 0~t1 | t1~t2 |
|---|---|---|
| MOBILE TERMINAL LOCATION | J | K |

FIG. 11A

TABLE C

| TIME DIFFERENCE | 0~t1 | t1~t2 | t2~t3 | t3~t4 | t4~t5 | t5~t6 |
|---|---|---|---|---|---|---|
| MOBILE TERMINAL LOCATION | L | M | N | O | P | Q |

FIG. 11B

TABLE D

| TIME DIFFERENCE | 0~t1 | t1~t2 |
|---|---|---|
| MOBILE TERMINAL LOCATION | R | S |

FIG. 11C

TABLE E

| TIME DIFFERENCE | 0~t1 | t1~t2 | t2~t3 | t3~t4 | t4~t5 | t5~t6 |
|---|---|---|---|---|---|---|
| MOBILE TERMINAL LOCATION | T | U | V | W | X | Y |

MOBILE-TERMINAL DETECTION APPARATUS AND MOBILE-TERMINAL DETECTION METHOD

CROSS REFERENCE TO RELATED APPLICATIONS

The present application is a continuation application of International Patent Application No. PCT/JP2017/042934 filed on Nov. 30, 2017, which designated the United States and claims the benefit of priority from Japanese Patent Application No. 2017-6599 filed on Jan. 18, 2017. The entire disclosures of all of the above applications are incorporated herein by reference.

TECHNICAL FIELD

The present disclosure relates to a technique for detecting the location of a mobile terminal capable of transmitting radio waves.

BACKGROUND

It may be conceivable that various services are provided for a vehicle occupant if a location of the occupant in the cabin or in the vicinity of the vehicle is detected. Vehicle occupants may carry a mobile terminal capable of wireless communication. Based on this situation, a technique has been proposed where radio waves from a mobile terminal are received using antennas installed on a vehicle or inside the vehicle cabin and thereby the location of the mobile terminal (and thus the location of the occupant) is detected.

SUMMARY

The present disclosure provides apparatus and method that detects a location of a mobile terminal. The apparatus is configured to receive the radio wave through an interior antenna; receive the radio wave through a leaky cable; detect a time difference; and detect the location of the mobile terminal.

BRIEF DESCRIPTION OF DRAWINGS

The above and other objects, features, and advantages of the present disclosure will become more apparent from the following detailed description with reference to the accompanying drawings. In the drawings:

FIG. 11A is a diagram illustrating an example table to be referenced when the location of the mobile terminal is detected outside the cabin;

FIG. 11B is a diagram illustrating an example table to be referenced when the location of the mobile terminal is detected outside the cabin;

FIG. 11C is a diagram illustrating an example table to be referenced when the location of the mobile terminal is detected outside the cabin;

DETAILED DESCRIPTION

Figure 1A:
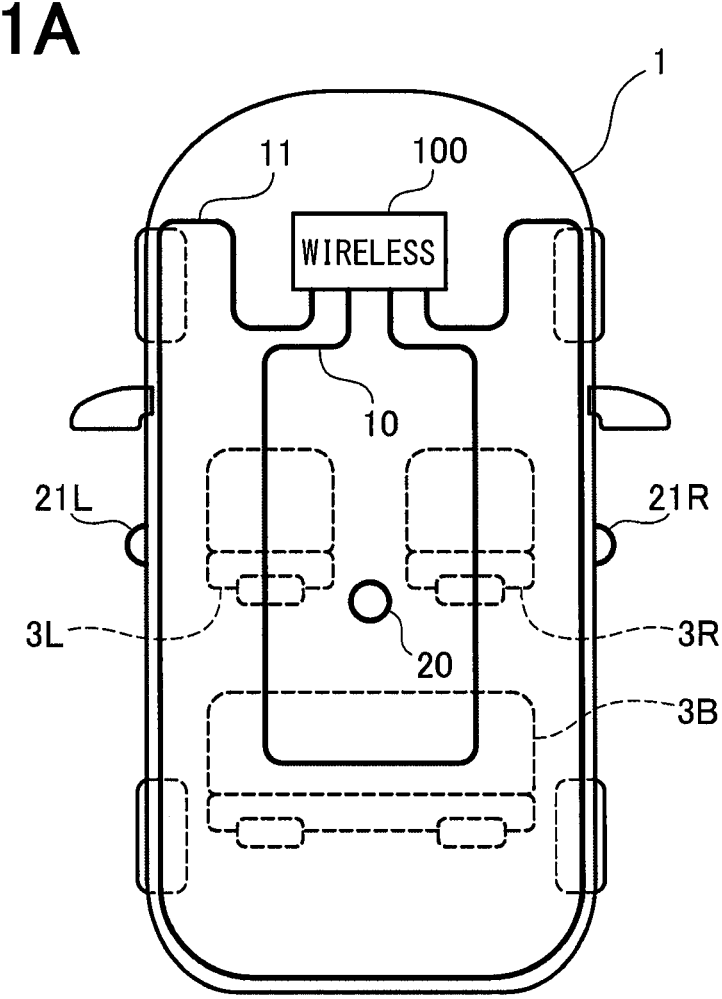
FIG. 1A is a diagram for describing a schematic structure of a vehicle including a wireless communication apparatus according to a present embodiment.

A technique according to a related art estimates distances from the antennas to the mobile terminal based on the reception strength at each antenna using properties of radio waves that the reception strength at an antenna reduces as the distance from the antenna to the transmitter of the radio waves increases. The location of the mobile terminal (and thus the location of an occupant holding the mobile terminal) may be detected by placing at least three antennas.

In reality, the related technique requires many antennas to detect the location of a mobile terminal with sufficient accuracy. This is for the reasons described below.

If a radio wave transmitted by the mobile terminal encounters an obstacle (a human body, for instance) before reaching an antenna, the radio wave is attenuated and thus the reception strength at the antenna is reduced. As a result, the distance from the antenna to the mobile terminal is estimated to be longer than it actually is. This may result in erroneous detection of the location of the mobile terminal. In order to avoid such errors, the number of antennas may be increased. If a distance estimated at one antenna is inconsistent with those estimated at other antennas, the inconsistent distance may be eliminated from the detection of the mobile terminal location or given less weight for the detection. Accuracy may be maintained with greater ease when a greater number of antennas are provided. Although only three antennas are needed in principle, more antennas (eight antennas, for example) may be needed in reality to maintain the accuracy.

The present disclosure provides a technique that allows accurate detection of the location of a mobile terminal in the vicinity of a vehicle or inside the vehicle cabin without increasing the number of antennas.

According to one aspect of the present disclosure, a mobile-terminal detection apparatus that detects a location of a mobile terminal inside a vehicle cabin is provided. The mobile terminal is capable of transmitting a radio wave wirelessly. The mobile-terminal detection apparatus may include: an antenna receiver that receives the radio wave through an interior antenna disposed inside the vehicle cabin; a leaky-cable receiver that receives the radio wave through a leaky cable disposed inside the vehicle cabin; a time difference detector that detects a time difference between a timing of reception of the radio wave from the mobile terminal through the interior antenna and a timing of reception of the radio wave through the leaky cable; and a mobile-terminal detector that detects, based on the time difference, the location of the mobile terminal relative to a path over which the leaky cable is laid.

According to another aspect of the present disclosure, a mobile-terminal detection method for detecting a location of a mobile terminal inside a vehicle cabin is provided. The mobile-terminal detection method may include: receiving the radio wave through an interior antenna disposed inside the vehicle cabin; receiving the radio wave through an leaky cable disposed inside the vehicle cabin; detecting a time difference between a timing of reception of the radio wave from the mobile terminal through the interior antenna and a timing of reception of the radio wave through the leaky cable; and detecting, based on the time difference, the location of the mobile terminal relative to a path over which the leaky cable is laid.

According to the mobile-terminal detection apparatus and the mobile-terminal detection method, the leaky cable is placed inside the vehicle cabin so that a radio wave from the mobile terminal is received not only through the interior antenna but also through the leaky cable. The location of the mobile terminal relative to the path over which the leaky cable is laid is detected based on a time difference between when the radio wave from the mobile terminal is received through the interior antenna and when that is received through the leaky cable. The mobile-terminal detection method may be referred to as a portable terminal detection method.

In this way, the location of the mobile terminal can be determined based on the time difference, in place of the reception strength. Furthermore, the range in which the location is detected can be determined in relation to the path over which the leaky cable is placed as needed. Thus, it is possible to determine the location of the mobile terminal with accuracy without increasing the number of antennas.

Embodiments of the present disclosure are described below.

(Configuration of the Apparatus)

FIG. 1A is a diagram illustrating a schematic structure of a vehicle 1 including a wireless communication apparatus 100 according to a present embodiment. As illustrated in FIG. 1A, an interior antenna 20 is placed inside a cabin of the vehicle 1. An exterior antenna 21L is placed on a left side portion of the vehicle 1. An exterior antenna 21R is placed on a right side portion of the vehicle 1. The interior antenna 20 and the exterior antennas 21L and 21R may be coupled to the wireless communication apparatus 100 via cables (not shown). The wireless communication apparatus 100 can communicate wirelessly with a wireless device (a mobile terminal, for instance) present inside the cabin by using the interior antenna 20. The wireless communication apparatus 100 can communicate wirelessly with a wireless device present outside the cabin in a location on the left side or right side of the vehicle 1 by using the exterior antenna 21L or the exterior antenna 21R.

While one interior antenna 20 is placed at the center of the cabin and one each exterior antenna (21L and 21R) is placed in the middle of the left and right side portions of the vehicle 1 in the present embodiment for purposes of brevity, more than one interior antenna 20 and/or more than one each of exterior antennas 21L and 21R may be provided. For example, three interior antennas 20 may be placed inside the cabin, and two each of exterior antennas 21L and 21R may be placed on the left and right side portions of the vehicle 1.

Figure 1B:
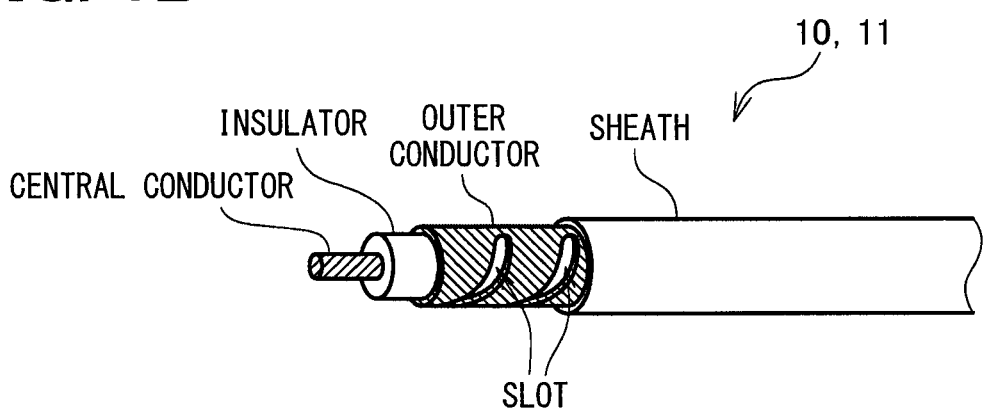
FIG. 1B is a diagram for describing the schematic structure of the vehicle including the wireless communication apparatus according to the present embodiment.

A leaky cable 10 is placed inside the cabin of the vehicle 1 according to the present embodiment. As illustrated in FIG. 1B, the leaky cable 10 may be a type of coaxial cable and may include a central conductor, an insulator surrounding the central conductor, an outer conductor placed outside the insulator, and a sheath placed outside the outer conductor in the outermost layer. The leaky cable 10 may have openings, called slots, at regular spacings in the outer conductor. The leaky cable forms a type of communication region around the leaky cable, allowing radio waves passing through the central conductor to leak to the outside through the slots and allowing nearby radio waves to leak into the central conductor through the slots. The radio waves may be referred to as electrical wave.

As illustrated in FIG. 1A, the leaky cable 10 according to the present embodiment may be laid (or wired, placed) in a path that goes under a left seat 3L and passes rightward under a three-person rear seat 3B and then under a right seat 3R to make one circuit in the cabin of the vehicle 1. A leading end and trailing end of the leaky cable 10 may be coupled to the wireless communication apparatus 100.

A leaky cable 11 is also placed outside the cabin of the vehicle 1 according to the present embodiment. With a leading end of the leaky cable 11 coupled to the wireless communication apparatus 100, the leaky cable 11 may be drawn out from the wireless communication apparatus 100, laid from a forward and leftward location toward the rear of the vehicle 1 on a bottom surface of a body of the vehicle, and then laid on a bottom surface side of a rear portion of the body to reach a rearward and rightward location. The leaky cable 11 may be then laid on the right side of the vehicle 1 on the bottom surface past a forward and rightward location of the vehicle 1 and coupled to the wireless communication apparatus 100.

As described above, the leaky cable 11 is placed outside the cabin of the vehicle 1, while the leaky cable 10 is placed inside the cabin of the vehicle 1. The leaky cable 10, which is placed inside the cabin, is hereinafter referred to as the interior cable 10. The leaky cable 11, which is placed outside the cabin, is referred to as the exterior cable 11 for distinction between the two. When there is no need to distinguish between the interior cable 10 and the exterior cable 11, they are simply referred to as the leaky cables 10 and 11.

While one interior cable 10 and one exterior cable 11 are placed in the present embodiment for purposes of brevity, more than one interior cable 10 and/or more than one exterior cable 11 may be provided.

The wireless communication apparatus 100 according to the present embodiment can communicate with a mobile terminal 2 present inside the cabin using the interior antenna 20 and communicate with the mobile terminal 2 present outside the cabin using the exterior antennas 21L and 21R. The wireless communication apparatus 100 according to the present embodiment can also detect a location of the mobile terminal 2 present inside or outside the cabin. When the location of the mobile terminal 2 inside the cabin is detected, the interior antenna 20 and the interior cable 10 are used in combination. When the location of the mobile terminal 2 outside the cabin is detected, the exterior antennas 21L and 21R and the exterior cable 11 are used in combination. The wireless communication apparatus 100 according to the present embodiment thus corresponds to a mobile-terminal detection apparatus or portable terminal detector according to the present disclosure.

Figure 2:
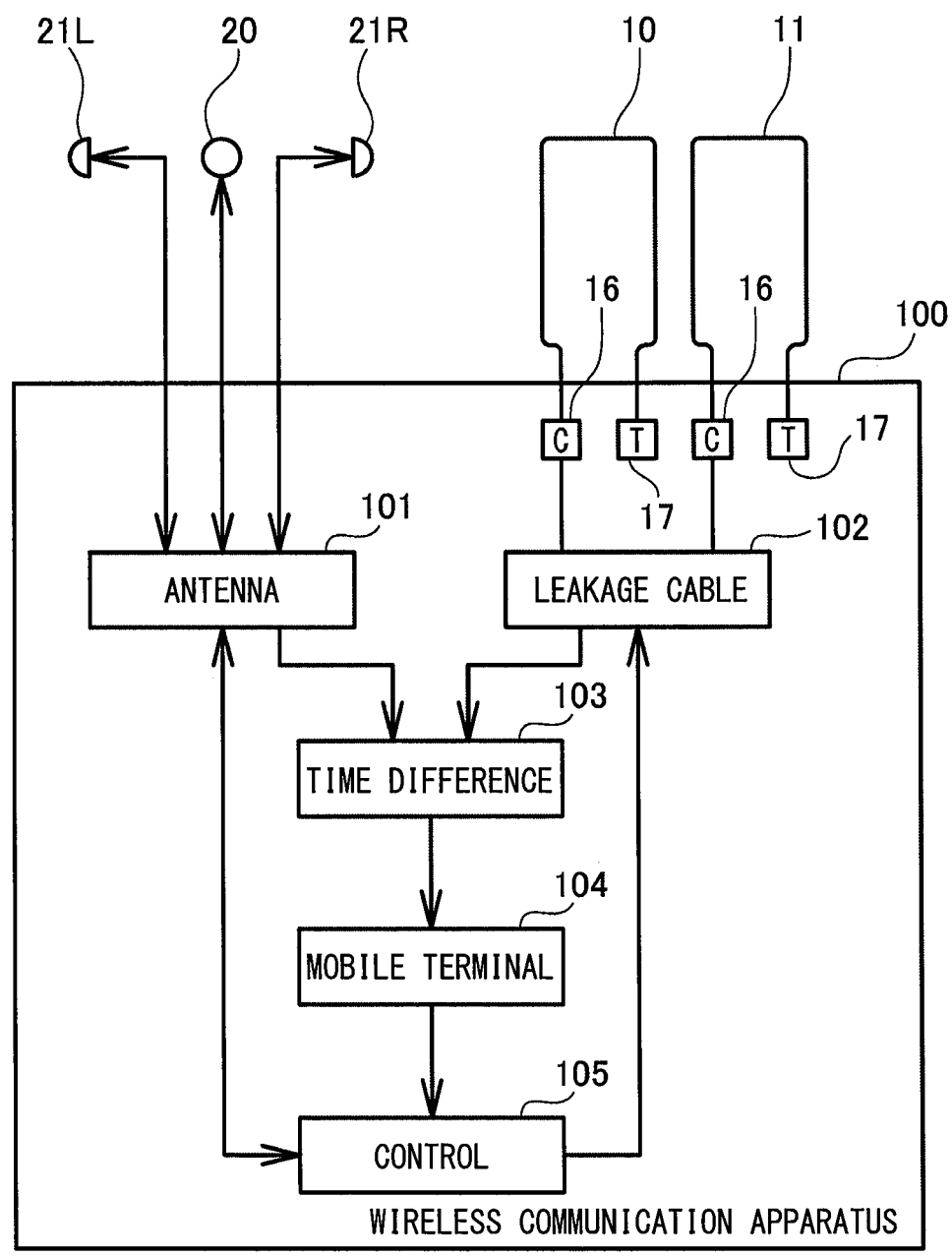
FIG. 2 is a block diagram of an inner structure of the wireless communication apparatus according to the present embodiment.

FIG. 2 is a diagram illustrating a schematic inner structure of the wireless communication apparatus 100 according to the present embodiment. As illustrated in FIG. 2, the wireless communication apparatus 100 according to the present embodiment includes an antenna communication portion 101, a leaky-cable receiver 102, a time difference detector 103, a mobile-terminal detector 104, and a controller 105. The leaky-cable receiver may be referred to as a leakage cable receiver.

These portions represent an abstract concept for classifying the inside of the wireless communication apparatus 100 for convenience and are based on the functions of the wireless communication apparatus 100, such as communication with the mobile terminal 2 and the like and detection of the location of the mobile terminal 2. This concept does not necessarily mean that the wireless communication apparatus 100 is physically sectioned into these portions. These portions can be achieved as a computer program executable by a CPU or as an electronic circuit including an LSI and a memory; alternatively, these portions can be achieved by combining them. In the present embodiment, the wireless communication apparatus 100 is mainly configured by using a microcomputer including a CPU, a ROM, a RAM, and the like, and the portions described above may be achieved by a computer program executed by the CPU.

The antenna communication portion 101 may be coupled to the interior antenna 20 and the exterior antennas 21L and 21R. The antenna communication portion 101 can receive or transmit radio waves through the interior antenna 20 and the exterior antennas 21L and 21R. The antenna communication portion 101 in the present embodiment corresponds to an antenna receiver of the present disclosure. In other words, the antenna communication portion 101 is configured to receive radio wave through the exterior antennas 21L and 21R oriented toward outside of the cabin.

The leaky-cable receiver 102 may be coupled to the leading ends of the leaky cables 10 and 11 through communication drivers 16. When the leaky cable 10 or 11 picks up a radio wave, the leaky-cable receiver 102 receives the radio wave through the corresponding communication driver 16. A trailing-end resistor 17 may be attached to the trailing end of each of the leaky cables 10 and 11 to inhibit reflection of radio waves passing through the respective cable.

The time difference detector 103 is coupled to the antenna communication portion 101. The time difference detector 103 acquires information on a timing of reception of a radio wave through the interior antenna 20, the exterior antenna 21L, or the exterior antenna 21R. The time difference detector 103 is also coupled to the leaky-cable receiver 102 and acquires information on a timing of reception of a radio wave through the interior cable 10 or the exterior cable 11. The time difference detector 103 then detects a time difference between the timing of reception of a radio wave through the interior antenna 20, the exterior antenna 21L, or the exterior antenna 21R and the timing of reception of a radio wave through the interior cable 10 or the exterior cable 11 and outputs a result to the mobile-terminal detector 104.

The mobile-terminal detector 104 detects the location of the mobile terminal 2 on the basis of the time difference received from the time difference detector 103. Reasons why the location of the mobile terminal 2 can be detected based on the time difference and a method for detecting the location will be described below.

The controller 105 controls the overall operation of the wireless communication apparatus 100. Specifically, to detect the location of the mobile terminal 2, the controller 105 outputs an instruction to detect the location to the antenna communication portion 101 and the leaky-cable receiver 102. The location of the mobile terminal 2 detected by the mobile-terminal detector 104 is output to the controller 105 so that the controller 105 recognizes the presence or absence of, and location of, the mobile terminal 2. Furthermore, to transmit a radio wave toward the mobile terminal 2, the controller 105 actuates the antenna communication portion 101 so that the interior antenna 20, the exterior antenna 21L, or the exterior antenna 21R transmits a radio wave.

(Wireless Communication Processing)

Figure 3:
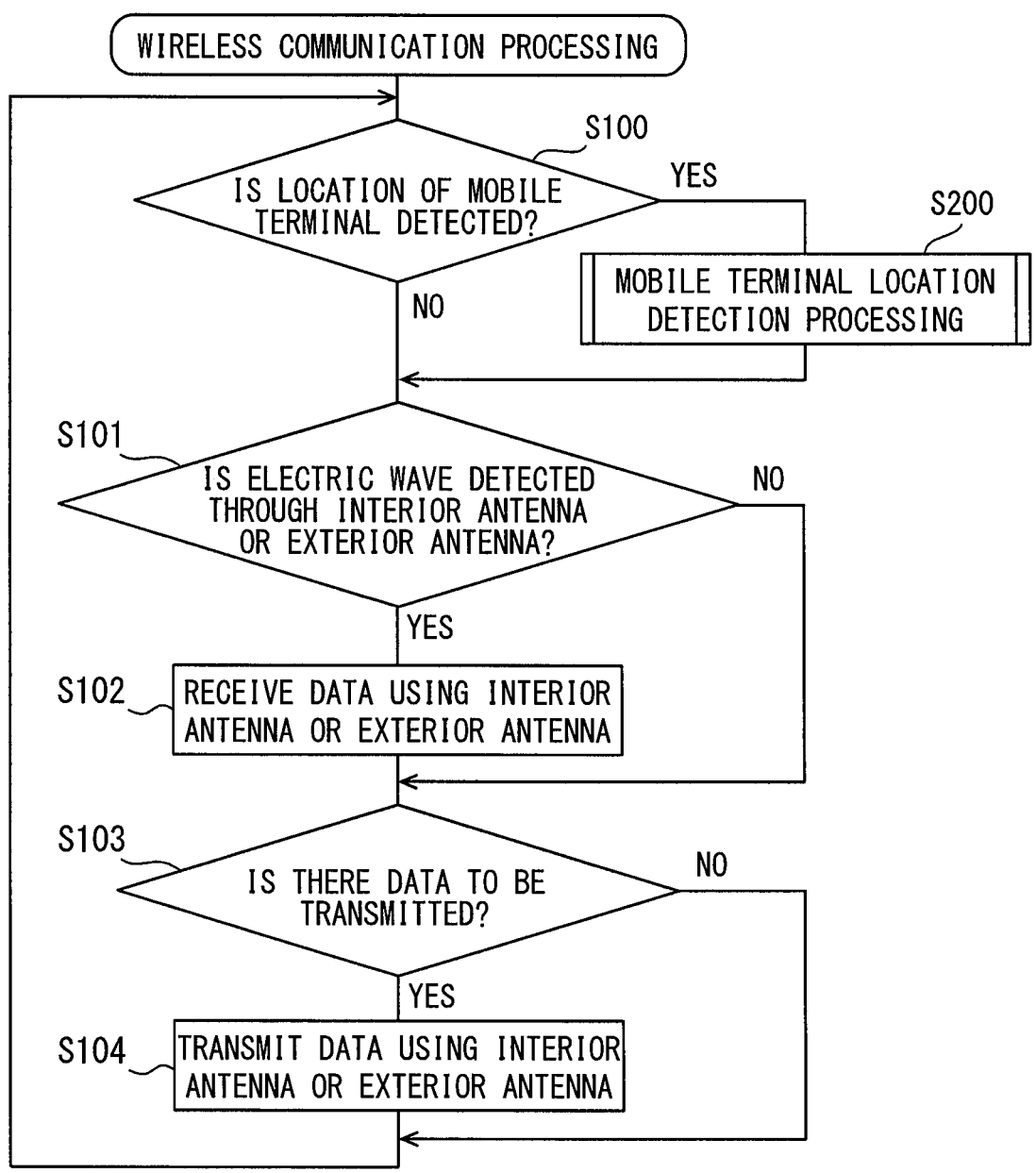
FIG. 3 is a flowchart for describing processing of the wireless communication apparatus according to the present embodiment for performing wireless communication with a mobile terminal.

FIG. 3 is a flowchart of processing of the wireless communication apparatus 100 according to the present embodiment to communicate wirelessly with the mobile terminal 2 by using the interior antenna 20, the exterior antenna 21L, or the exterior antenna 21R. The wireless communication apparatus 100 detects the location of the mobile terminal 2 in this processing.

As illustrated in FIG. 3, on starting the wireless communication processing, the wireless communication apparatus 100 first determines (S100) whether to detect the location of the mobile terminal 2. While it is assumed in the present embodiment that the location of the mobile terminal 2 is detected every time a certain period (3 to 5 seconds, for instance) elapses, this is not a limitation. For example, the location of the mobile terminal 2 may be detected when there is a request from another in-vehicle device or the like.

If the certain period has not elapsed since the previous detection of the location of the mobile terminal 2 (S100: NO), it is determined not to detect the location of the mobile terminal 2. Subsequently, it is determined (S101) whether a radio wave has been detected through the interior antenna 20, the exterior antenna 21L, or the exterior antenna 21R. If a radio wave has been detected (S101: YES), its data is received (S102) by using one of the antennas through which the radio wave has been detected.

If a radio wave has not been detected through the interior antenna 20, the exterior antenna 21L, or the exterior antenna 21R (S101: NO), data is not received and it is determined (S103) whether there is data to be transmitted. If there is data to be transmitted (S103: YES), a radio wave is transmitted (S104) from the interior antenna 20, the exterior antenna 21L, or the exterior antenna 21R. If there is no data to be transmitted (S103: NO), data is not transmitted. The processing goes back to the top and it is re-determined (S100) whether to detect the location of the mobile terminal 2.

After the processing described above is repeated until the certain period elapses, it is determined to detect the location of the mobile terminal 2 (S100: YES). Then, mobile-terminal location detection processing is started (S200) to detect the location of the mobile terminal 2.

(Mobile-Terminal Location Detection Processing)
(Principle on which Location of Mobile Terminal is Detected)

A principle on which the wireless communication apparatus 100 according to the present embodiment detects the location of the mobile terminal 2 is described below. As described above with reference to FIG. 1A and FIG. 1B, the vehicle 1 including the wireless communication apparatus 100 according to the present embodiment includes the interior antenna 20, the exterior antennas 21L and 21R, the interior cable 10, and the exterior cable 11. A radio wave is thus received through the interior antenna 20 and the interior cable 10 redundantly when the mobile terminal 2 is present inside the cabin. When the mobile terminal 2 is present outside the cabin, a radio wave is received through the exterior cable 11 and one of the exterior antennas 21L and 21R on the left and right sides redundantly. The wireless communication apparatus 100 according to the present embodiment uses this redundancy to detect the location of the mobile terminal 2.

FIG. 4A to FIG. 4D are diagrams for describing the principle on which the location of the mobile terminal 2 is detected when the mobile terminal 2 is present inside the cabin. For example, it is assumed that the mobile terminal 2 is in a location illustrated in FIG. 4A. This assumption corresponds to a case in which the mobile terminal 2 is present near the left seat 3L (see FIG. 1A). When the mobile terminal 2 transmits a radio wave in this case, the radio wave passes through the air in the cabin and is received through the interior antenna 20. The radio wave is also received through the communication driver 16 via the interior cable 10 as marked with a thick broken-line arrow in FIG. 4A. Here, the speed at which a radio wave passes through the leaky cable 10 or 11 is slower than the speed at which the radio wave passes through the air. A timing ta of reception of the radio wave through the interior antenna 20 and a timing tc of reception of the radio wave through the communication driver 16 of the interior cable 10 has a time difference.

Figure 4A:
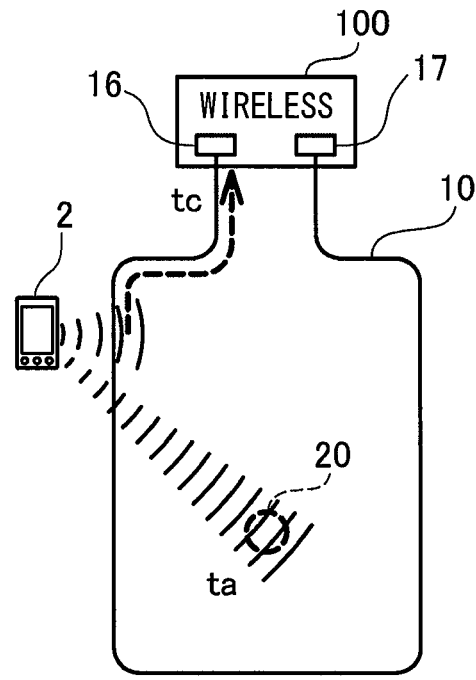
FIG. 4A is a diagram for describing a principle on which the wireless communication apparatus according to the present embodiment detects the location of the mobile terminal inside a vehicle cabin.
Figure 4B:
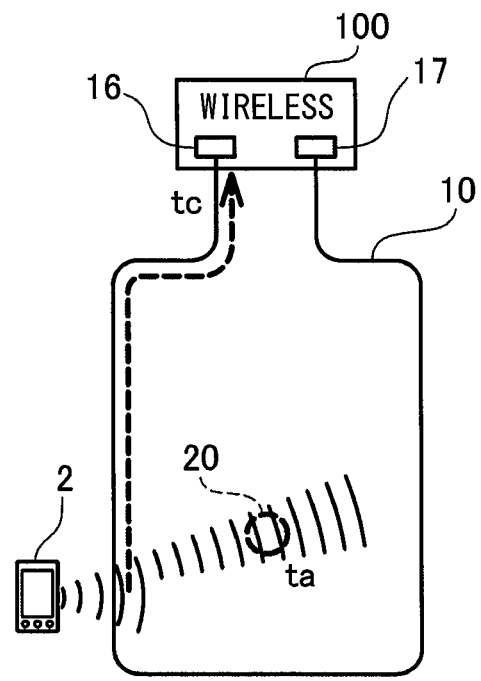
FIG. 4B is a diagram for describing the principle on which the wireless communication apparatus according to the present embodiment detects the location of the mobile terminal inside the cabin.

It is assumed that the mobile terminal 2 is then moved to a location illustrated in FIG. 4B. This assumption corresponds to a case in which the mobile terminal 2 is present near a left portion of the rear seat 3B (see FIG. 1A). When the mobile terminal 2 transmits a radio wave in this case, the radio wave is received also through the interior antenna 20 and the communication driver 16 of the interior cable 10. The distance over which the radio wave travels through the interior cable 10 increases as marked with a thick broken-line arrow in FIG. 4B. The timing tc of reception of the radio wave through the communication driver 16 is thus later than that in the case of FIG. 4A. The timing ta of reception of the radio wave through the interior antenna 20 is not very different from that in the case of FIG. 4A. Thus, when the mobile terminal 2 moves from the location in FIG. 4A to that in FIG. 4B, the time difference increases between the timing ta of reception of the radio wave through the interior antenna 20 and the timing tc of reception of the radio wave through the communication driver 16 of the interior cable 10.

Figure 4C:
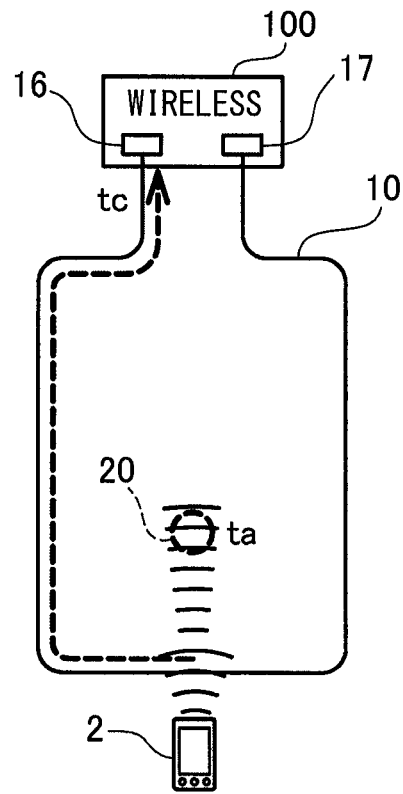
FIG. 4C is a diagram for describing the principle on which the wireless communication apparatus according to the present embodiment detects the location of the mobile terminal inside the cabin.
Figure 4D:
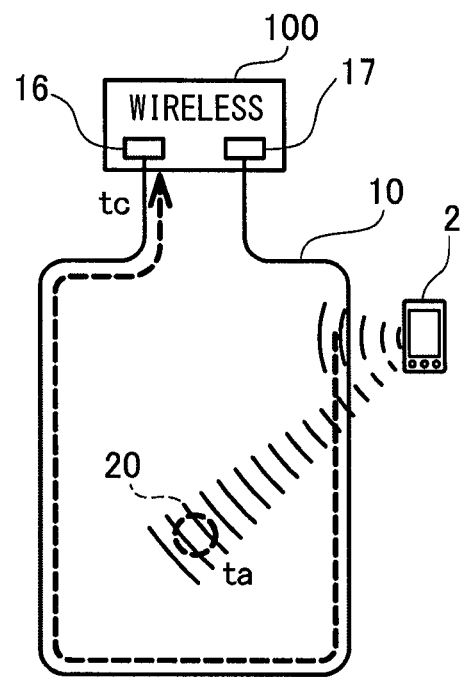
FIG. 4D is a diagram for describing the principle on which the wireless communication apparatus according to the present embodiment detects the location of the mobile terminal inside the cabin.

When the mobile terminal 2 is in a location illustrated in FIG. 4C or a location illustrated in FIG. 4D, the distance over which the radio wave travels through the interior cable 10 further increases. The timing tc of reception of the radio wave through the communication driver 16 of the interior cable 10 is thus further delayed. The time difference with the timing ta of reception of the radio wave through the interior antenna 20 further increases accordingly. As described above, the time difference between the timing ta of reception of the radio wave from the mobile terminal 2 through the interior antenna 20 after the radio wave passing through the air and the timing tc of reception of the radio wave through the interior cable 10 varies in accordance with the location of the mobile terminal 2.

A wireless communication device, such as the mobile terminal 2, may transmit a search signal with a certain cycle (for example, every 100 msec) to find a device to communicate with and establish the connection. For example, in a telecommunications standard using a communication frequency band of 2.4 GHz, a search signal, called advertise signal, is transmitted with a certain cycle. The location of the mobile terminal 2 is detected based on the time difference between when the search signal is received through the interior antenna 20 and when that is received through the interior cable 10.

FIG. 5A to FIG. 5D are charts for describing how a search signal from the mobile terminal 2 is received through the interior antenna 20 and the interior cable 10 (through the communication driver 16 of the interior cable 10, to be more precise) in the cases illustrated in FIG. 4A to FIG. 4D, respectively.

Figure 5A:
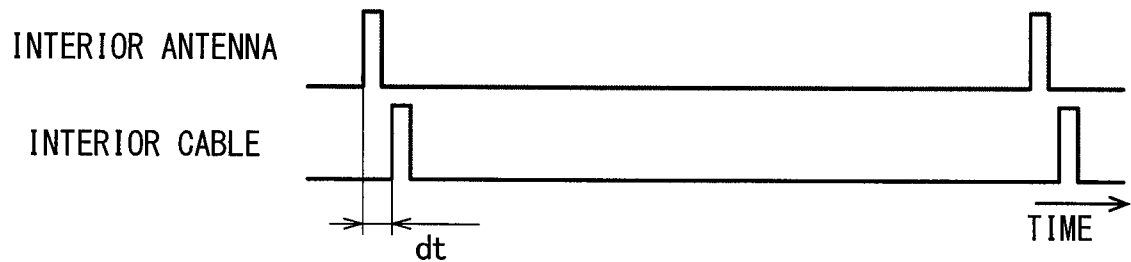
FIG. 5A is a diagram for describing how reception timings of an interior antenna and a leaky cable vary with the location of the mobile terminal inside the cabin.

When the mobile terminal 2 is present near the left seat 3L (see FIG. 4A), for instance, a time difference dt between when the search signal is received through the interior antenna 20 and when that is received through the interior cable 10 is small as illustrated in FIG. 5A because the distance over which the radio wave travels through the interior cable 10 is short.

Figure 5B:
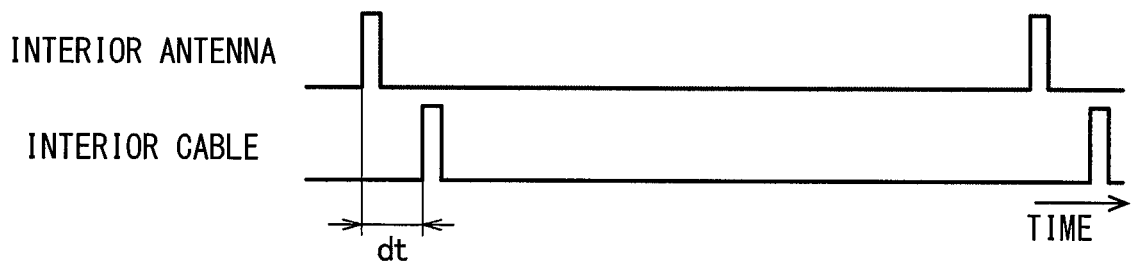
FIG. 5B is a diagram for describing how the reception timings of the interior antenna and the leaky cable vary with the location of the mobile terminal inside the cabin.

When the mobile terminal 2 is present near the left portion of the rear seat 3B (see FIG. 4B), the distance over which the radio wave travels through the interior cable 10 increases. Accordingly, the timing of reception of the search signal through the interior cable 10 is delayed as illustrated in FIG. 5B. The time difference dt between when the search signal is received through the interior antenna 20 and when that is received through the interior cable 10 thus increases.

Figure 5C:
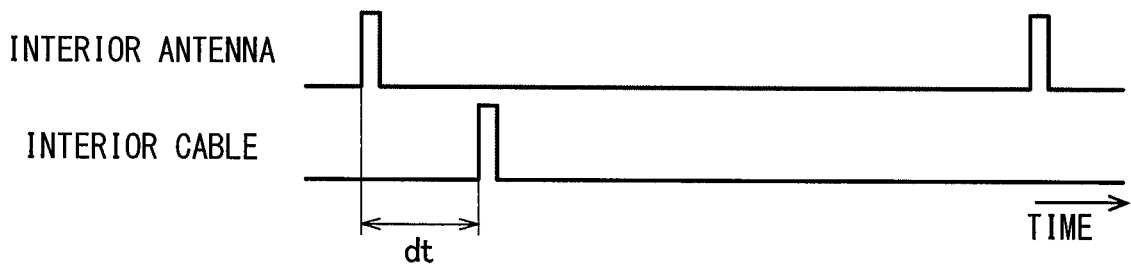
FIG. 5C is a diagram for describing how the reception timings of the interior antenna and the leaky cable vary with the location of the mobile terminal inside the cabin.

When the mobile terminal 2 is present near a middle portion of the rear seat 3B (see FIG. 4C), the distance over which the radio wave travels through the interior cable 10 further increases. Thus, the time difference dt between when the search signal is received through the interior antenna 20 and when that is received through the interior cable 10 further increases as illustrated in FIG. 5C.

When the mobile terminal 2 is present near the right seat 3R (see FIG. 4D), the distance over which the radio wave passes through the interior cable 10 even further increases. Thus, the time difference dt between when the search signal is received through the interior antenna 20 and when that is received through the interior cable 10 further increases as illustrated in FIG. 5D.

Figure 5D:
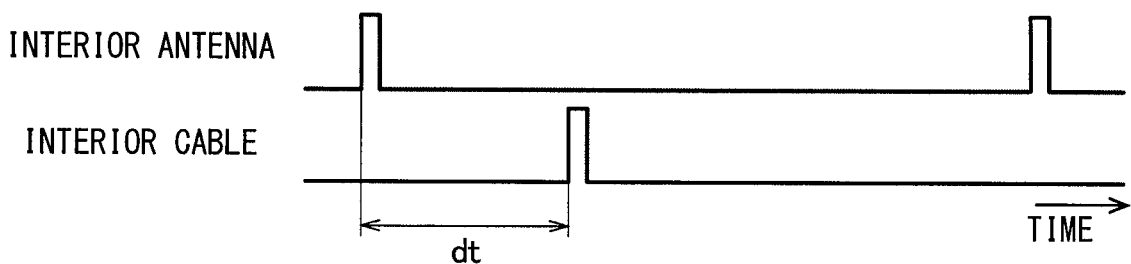
FIG. 5D is a diagram for describing how the reception timings of the interior antenna and the leaky cable vary with the location of the mobile terminal inside the cabin.

Even when the timing of reception of the search signal through the interior cable 10 is delayed, the time taken for the search signal to be received through the interior cable 10 is sufficiently shorter than the time interval at which the mobile terminal 2 transmits the search signal with the certain cycle as illustrated in FIG. 5D. There is no risk of the interior antenna 20 receiving a next search signal before the search signal is received through the interior cable 10 and thus of erroneous detection of the time difference.

The location of the mobile terminal 2 relative to the path of the interior cable 10 can thus be obtained by detecting the time difference dt between when the search signal is received through the interior antenna 20 and when that is received through the interior cable 10. In other words, the location of the mobile terminal 2 on the path of the interior cable 10 can be obtained.

When the mobile terminal 2 is present outside the cabin, the location of the mobile terminal 2 can be detected in a roughly similar manner, with a difference being that the search signal is received through one of the exterior antennas 21L and 21R on the left and right sides.

Figure 6A:
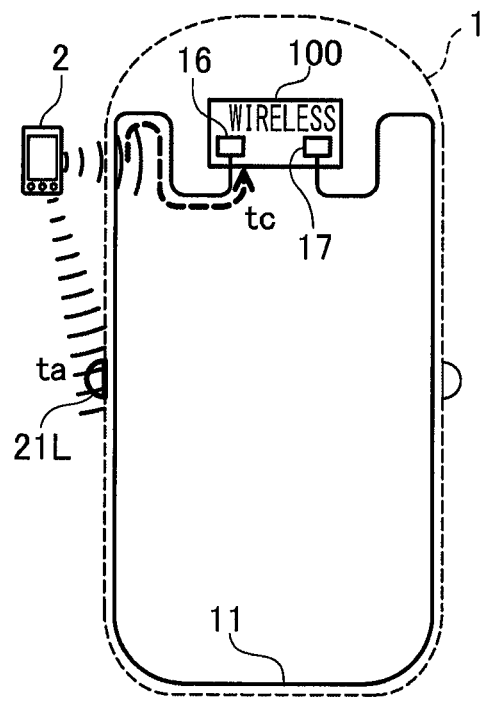
FIG. 6A is a diagram for describing a principle on which the wireless communication apparatus according to the present embodiment detects the location of the mobile terminal outside the cabin.

FIG. 6A to FIG. 6D are diagrams for describing a principle on which the location of the mobile terminal 2 is detected when the mobile terminal 2 is present outside the cabin. For example, as illustrated in FIG. 6A, when the mobile terminal 2 transmits a radio wave (which is a search signal here) from a forward location on the left side of the vehicle 1, the search signal is received through the exterior antenna 21L on the left side of the vehicle 1 and through the communication driver 16 of the exterior cable 11 via the exterior cable 11. In this case, the timing ta of reception of the search signal through the exterior antenna 21L and the timing tc of reception of the search signal through the communication driver 16 of the exterior cable 11 has a time difference.

Figure 6B:
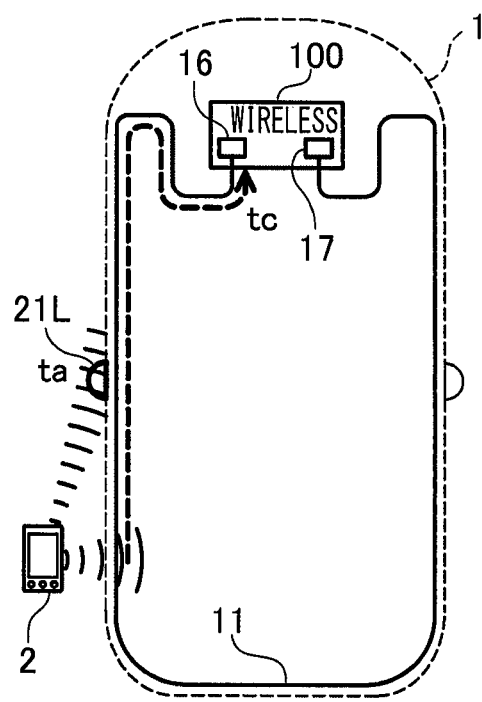
FIG. 6B is a diagram for describing the principle on which the wireless communication apparatus according to the present embodiment detects the location of the mobile terminal outside the cabin.

As illustrated in FIG. 6B, when the mobile terminal 2 moves to a rearward location on the left side of the vehicle 1, the distance over which the search signal from the mobile terminal 2 travels through the exterior cable 11 increases. Accordingly, the timing tc of reception of the search signal through the communication driver 16 of the exterior cable 11 is delayed. The time difference between the reception through the exterior antenna 21L and the reception through the communication driver 16 of the exterior cable 11 thus increases.

Figure 6C:
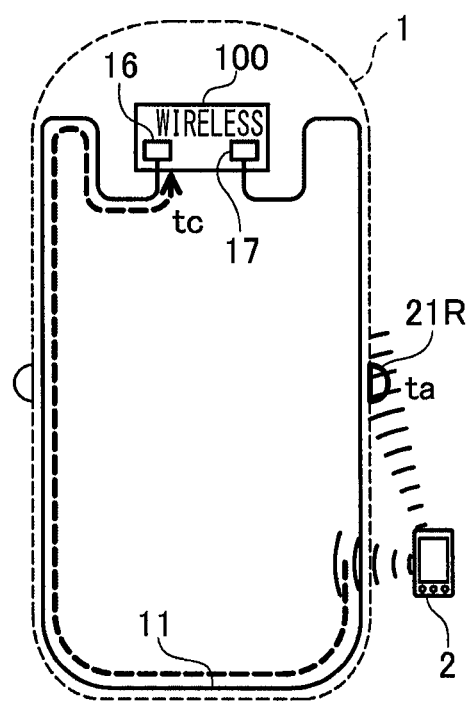
FIG. 6C is a diagram for describing the principle on which the wireless communication apparatus according to the present embodiment detects the location of the mobile terminal outside the cabin.

As illustrated in FIG. 6C, when the mobile terminal 2 transmits the search signal from a location rightward and rearward of the vehicle 1, the search signal is received through the exterior antenna 21R on the right side of the vehicle 1. The search signal is also received through the communication driver 16 of the exterior cable 11 via the exterior cable 11. The distance over which the search signal travels through the exterior cable 11 increases; thus, the timing tc of reception of the search signal through the communication driver 16 of the exterior cable 11 is delayed. The time difference between the reception through the exterior antenna 21R and the reception through the communication driver 16 of the exterior cable 11 is longer than that in a case where the mobile terminal 2 is present on the left side of the vehicle 1 (in the case of FIG. 6B, for instance).

Figure 6D:
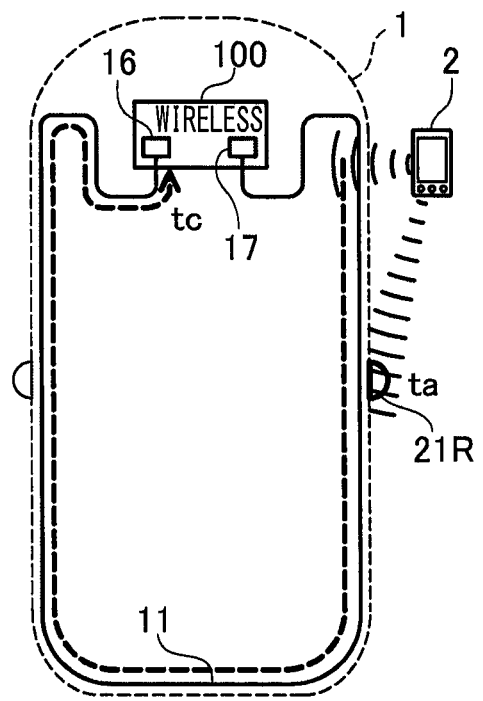
FIG. 6D is a diagram for describing the principle on which the wireless communication apparatus according to the present embodiment detects the location of the mobile terminal outside the cabin.

As illustrated in FIG. 6D, when the mobile terminal 2 further moves from the rearward location on the right side of the vehicle 1 to a forward location on the right side of the vehicle 1, the distance over which the search signal from the mobile terminal 2 travels through the exterior cable 11 further increases. Thus, the timing tc of reception of the search signal through the communication driver 16 of the exterior cable 11 is further delayed. The time difference between when the search signal is received through the exterior antenna 21R and when it is received through the communication driver 16 of the exterior cable 11 thus further increases.

Figure 7A:
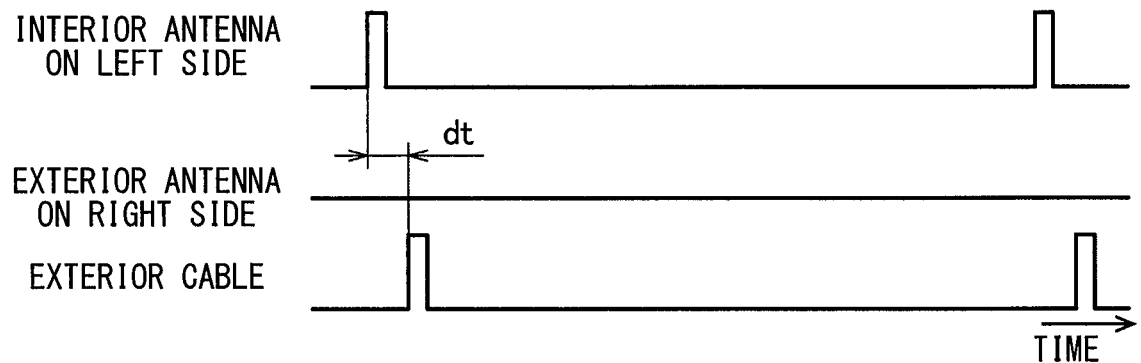
FIG. 7A is a diagram for describing how reception timings of an exterior antenna and a leaky cable vary with the location of the mobile terminal outside the cabin.
Figure 7B:
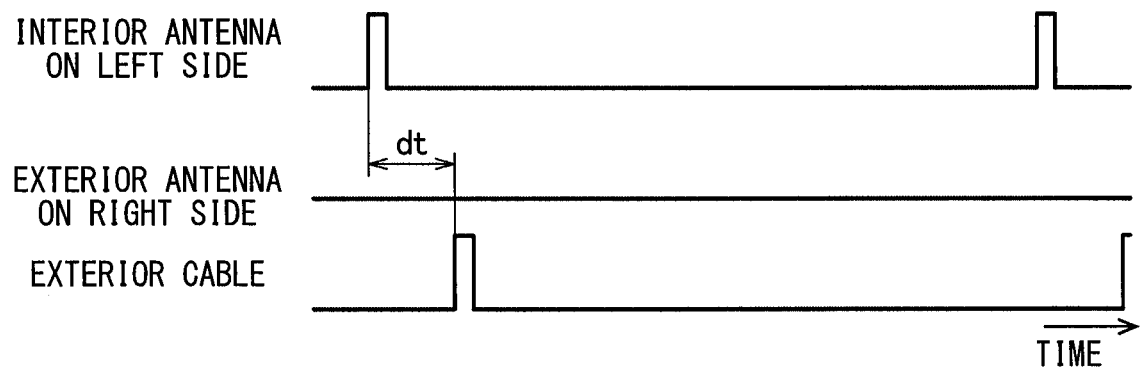
FIG. 7B is a diagram for describing how the reception timings of the exterior antenna and the leaky cable vary with the location of the mobile terminal outside the cabin.
Figure 7C:
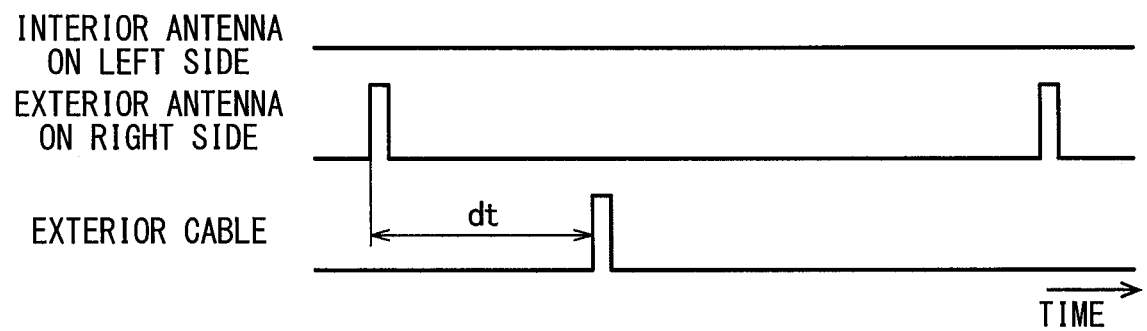
FIG. 7C is a diagram for describing how the reception timings of the exterior antenna and the leaky cable vary with the location of the mobile terminal outside the cabin.
Figure 7D:
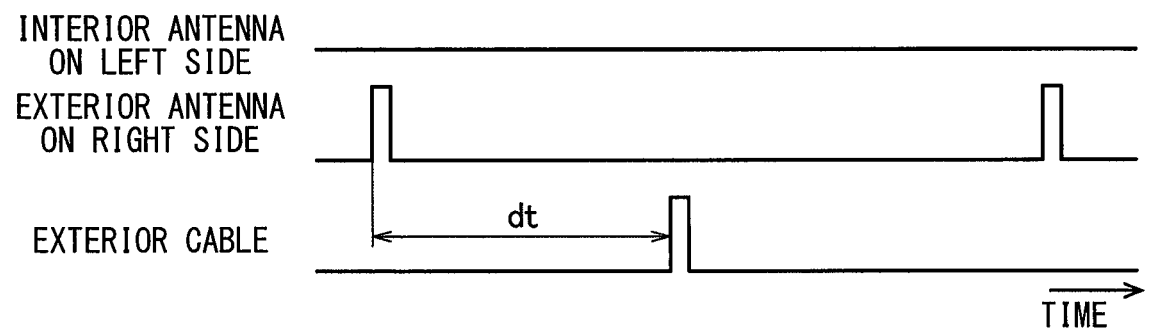
FIG. 7D is a diagram for describing how the reception timings of the exterior antenna and the leaky cable vary with the location of the mobile terminal outside the cabin.

FIG. 7A to FIG. 7D are charts for describing how a search signal from the mobile terminal 2 is received through the exterior cable 11 (or the communication driver 16 of the exterior cable 11 to be more precise) and one of the exterior antennas 21L and 21R on the left and right sides when the mobile terminal 2 is present outside the cabin. FIG. 7A represents a case in which the mobile terminal 2 is in the location in FIG. 6A. FIG. 7B represents a case in which the mobile terminal 2 is in the location in the FIG. 6B. FIG. 7C represents a case in which the mobile terminal 2 is in the location in FIG. 6C. FIG. 7D is represents a case in which the mobile terminal 2 is in the location in FIG. 6D.

When the mobile terminal 2 is in a location on the left side of the vehicle 1 (i.e., in the case of FIG. 6A or FIG. 6B), the search signal is received through the exterior antenna 21L on the left side and through the exterior cable 11 as illustrated in FIG. 7A and FIG. 7B. The distance over which the search signal travels through the exterior cable 11 varies with the location of the mobile terminal 2. Thus, the time difference dt between when the search signal is received through the exterior antenna 21L on the left side and when the search signal is received through the exterior cable 11 also varies.

When the mobile terminal 2 is in a location on the right side of the vehicle 1 (i.e., in the case of FIG. 6C or FIG. 6D), the search signal is received through the exterior antenna 21R on the right side and through the exterior cable 11 as illustrated in FIG. 7C and FIG. 7D. The distance over which the search signal travels through the exterior cable 11 also varies with the location of the mobile terminal 2 in this case. Thus, the time difference dt between when the search signal is received through the exterior antenna 21R on the right side and when the search signal is received through the exterior cable 11 also varies.

Even when the timing of reception of the search signal through the exterior cable 11 is delayed, the time taken for the search signal to be received through the exterior cable 11 is sufficiently shorter than the time interval at which the mobile terminal 2 transmits the search signal with the certain cycle as illustrated in FIG. 7D also for cases where the mobile terminal 2 is present outside the cabin. There is no risk of the exterior antenna 21R on the right side receiving a next search signal before the search signal is received through the exterior cable 11 and thus of erroneous detection of the time difference.

The location of the mobile terminal 2 relative to the path of the exterior cable 11 can thus be determined also for cases where the mobile terminal 2 is present outside the cabin by detecting the time difference dt between when the search signal is received through one of exterior antennas 21L and 21R on the left and right sides and when the search signal is received through exterior cable 11.

(Procedure of Mobile-Terminal Location Detection Processing)

Figure 8:
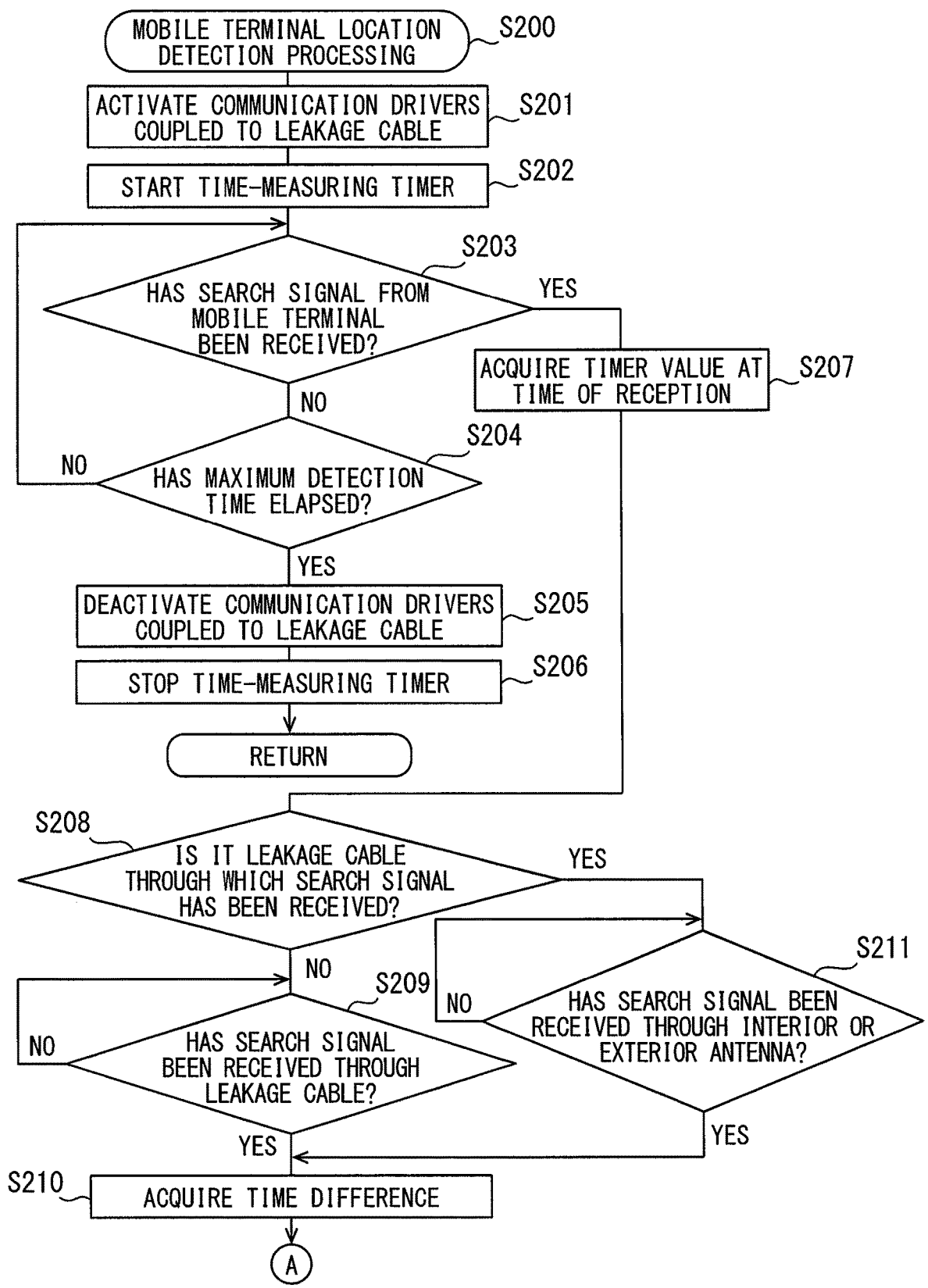
FIG. 8 is a flowchart for describing the first half of processing of the wireless communication apparatus according to the present embodiment for detecting the location of the mobile terminal.
Figure 9:
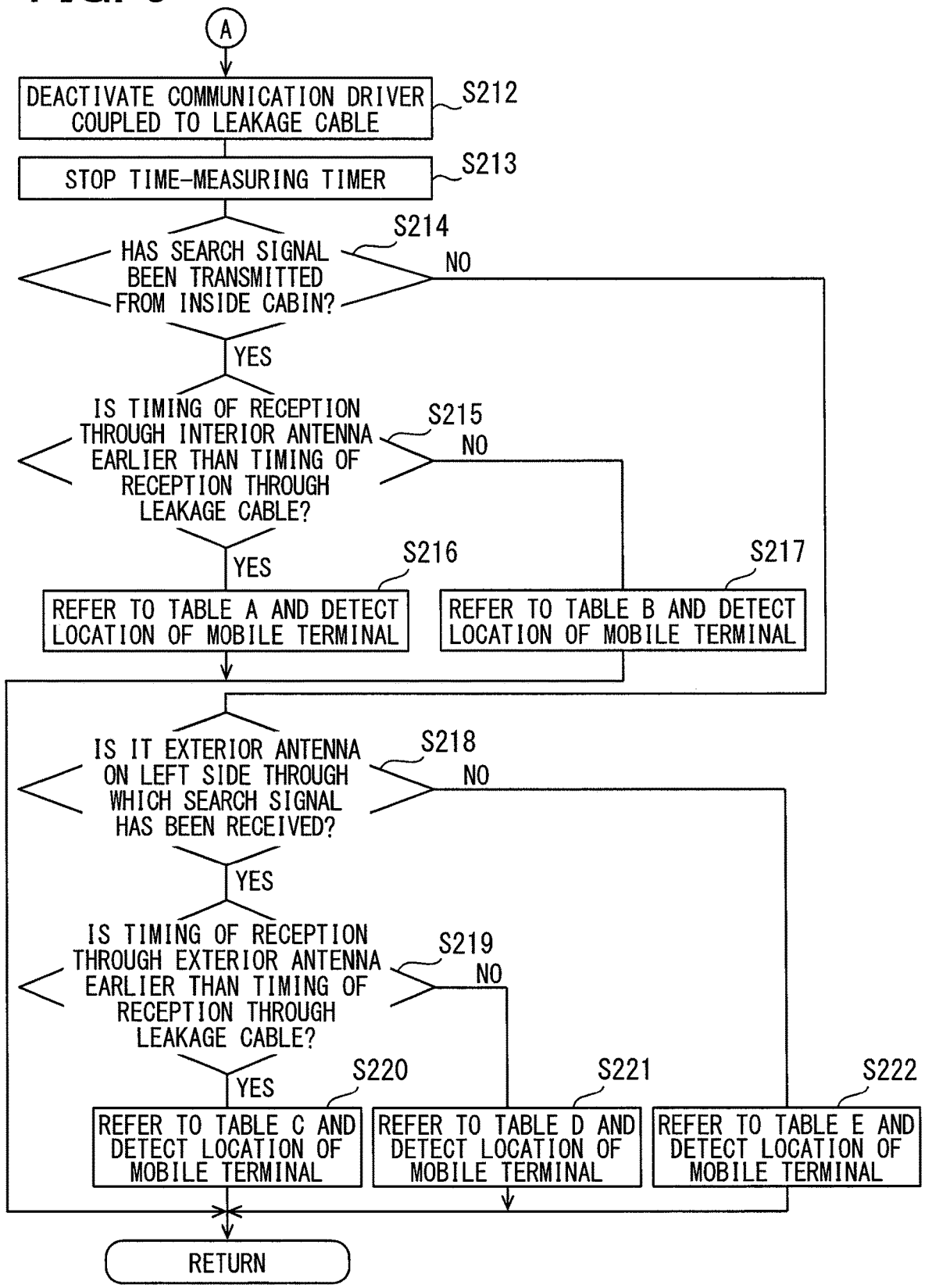
FIG. 9 is a flowchart for describing the latter half of the processing of the wireless communication apparatus according to the present embodiment for detecting the location of the mobile terminal.

FIG. 8 and FIG. 9 are flowcharts for describing the flow of the mobile-terminal location detection processing of the wireless communication apparatus 100 according to the present embodiment for detecting the location of the mobile terminal 2. This processing is started when it is determined to detect the location of the mobile terminal 2 (S100: YES) in the wireless communication processing described above with reference to FIG. 3.

As described in FIG. 8, the communication drivers 16 coupled to the leaky cables 10 and 11 (i.e., the interior cable 10 and the exterior cable 11) are activated (S201) first in the mobile-terminal location detection processing (S200). The wireless communication apparatus 100 according to the present embodiment performs communication using the interior antenna 20 and the exterior antennas 21L and 21R on the left and right sides, but not the leaky cables 10 and 11, when the detection of the location of the mobile terminal 2 is not performed. To curb the consumption of electric power, the communication drivers 16 coupled to the leaky cables 10 and 11 are deactivated when the detection of the location of the mobile terminal 2 is not performed. The communication drivers 16 coupled to the leaky cables 10 and 11 are thus activated first upon the start of the mobile-terminal location detection processing (S200).

Then, a time-measuring timer is started (S202) to acquire a difference in time when a search signal from the mobile terminal 2 is received.

It is then determined (S203) whether a search signal from the mobile terminal 2 has been received. As described above, a search signal is a signal that a wireless communication device, such as the mobile terminal 2, transmits with a certain cycle (for example, every 100 msec) to find a device to communicate with and establish the connection. For example, a signal called an advertise signal in a telecommunications standard using a communication frequency band of 2.4 GHz can be used as a search signal.

When the mobile terminal 2 is present inside the cabin, the search signal is received through the interior antenna 20 and the leaky cable 10 (i.e., the interior cable 10) laid inside the cabin. When the mobile terminal 2 is present outside the cabin, the search signal is received through the leaky cable 11 (i.e., exterior cable 11) laid outside the cabin and one of the exterior antennas 21L and 21R on the left and right sides. As described above with reference to FIG. 4A to FIG. 7D, the search signal is often received through the interior antenna 20 before it is received through the interior cable 10, or it is often received through one of the exterior antennas 21L and 21R on the left and right sides before it is received through the exterior cable 11.

The search signal, however, may be received through the interior cable 10 or the exterior cable 11 before it is received through the interior antenna 20, the exterior antenna 21L, or the exterior antenna 21R depending on the relationship between the location of the mobile terminal 2 and the locations of the interior antenna 20 and exterior antennas 21L and 21R. It is thus determined in S203 whether the search signal from the mobile terminal 2 has been received through any of the interior antenna 20, the exterior antenna 21L on the left side, the exterior antenna 21R on the right side, the interior cable 10, and the exterior cable 11.

If it is determined that the search signal has not been received (S203: NO), it is determined (S204) whether the time elapsing since the start of the detection of location of the mobile terminal has reached a predefined maximum detection time (10 seconds, for instance). The time elapsing does not reach the maximum detection time for a certain time after the start of the detection of the location of the mobile terminal (S204: NO). It is then re-determined (S203) whether the search signal from the mobile terminal 2 has been received.

After this processing is repeated, the search signal from the mobile terminal 2 is received eventually if the mobile terminal 2 is in the vicinity of the vehicle 1 or inside the cabin. If the maximum detection time has elapsed without receiving the search signal (S204: YES), an assumption may be made that the mobile terminal 2 is not present. The communication drivers 16, which have been activated in S201, are deactivated (S205) and the time-measuring timer, which has been started in S202, is stopped (S205). The mobile-terminal location detection processing in FIG. 8 is finished and the wireless communication processing described in FIG. 3 is resumed.

If the search signal from the mobile terminal 2 is received through any of the interior antenna 20, the exterior antenna 21L on the left side, the exterior antenna 21R on the right side, the interior cable 10, and the exterior cable 11 (S203: YES), a timer value is acquired (S207) at the time of reception of the search signal.

It is determined (S208) whether it is the leaky cable 10 or 11 (i.e., the interior cable 10 or the exterior cable 11) through which the search signal from the mobile terminal 2 has been received.

As described above with reference to FIG. 5A to FIG. 5D or FIG. 7A to FIG. 7D, the search signal is often received through the interior antenna 20 before it is received through the interior cable 10, or it is often received through the exterior antenna 21L or 21R before it is received through the leaky cable 11. In such cases, "NO" is determined in S208. Then, it is determined (S209) whether the search signal has been received through the leaky cable 10 or 11.

If the search signal has not been received (S209: NO), the same determination is repeated, which will bring about a standby state. When it is finally determined that the search signal has been received through the leaky cable 10 or the leaky cable 11 (S209: YES), a time difference is acquired (S210) between when the search signal is received through the interior antenna 20, the exterior antenna 21L, or the exterior antenna 21R and when it is received through the leaky cable 10 or 11. In this case, a time difference is acquired between a timer value obtained at the time of reception of the search signal through the leaky cable 10 or the leaky cable 11 and the timer value already obtained in S207, which is for the reception of the search signal through the interior antenna 20, the exterior antenna 21L, or the exterior antenna 21R.

If "YES" is determined in S208, it means that the search signal has been received through the leaky cable 10 or 11 before it is received through the interior antenna 20, the exterior antenna 21L, or the exterior antenna 21R. It is then determined (S211) whether the search signal has been received through the interior antenna 20, the exterior antenna 21L, or the exterior antenna 21R.

If the search signal has not been received (S211: NO), the same determination is repeated, which will bring about a standby state. It is eventually determined that the search signal has been received through the interior antenna 20, the exterior antenna 21L, or the exterior antenna 21R (S211: YES). A time difference is then acquired (S210) between when the search signal is received through the leaky cable 10 or 11 and when it is received through the interior antenna 20, the exterior antenna 21L, or the exterior antenna 21R. In this case, specifically, a time difference is acquired between a timer value obtained at the time of reception of the search signal through the interior antenna 20, the exterior antenna 21L, or the exterior antenna 21R and the timer value already obtained in S207, which is for the reception of the search signal through the leaky cable 10 or 11.

When the time difference is acquired (S210), the communication drivers 16, which have been activated in S201, are deactivated (S212 in FIG. 9) and the time-measuring timer is stopped (S213).

It is then determined (S214) whether the search signal has been transmitted from inside the cabin. When the mobile terminal 2 transmits the search signal from inside the cabin, the search signal is received through the interior cable 10, but not through the exterior cable 11, which is placed in a location separated by an iron plate from the mobile terminal 2. When the mobile terminal 2 transmits the search signal from outside the cabin, the search signal is received through the exterior cable 11, but not through the interior cable 10, which is placed in a location separated by the iron plate from the mobile terminal 2. It can thus be determined whether the search signal has been transmitted from inside the cabin on the basis of whether the signal has been received through the interior cable 10 or the exterior cable 11.

If the search signal has been transmitted from inside the cabin, that is, if the search signal has been received through the interior cable 10 (S214: YES), it is determined (S215) whether the timing of reception of the search signal through the interior antenna 20 is earlier than that through the interior cable 10. As described above with reference to FIG. 4A to FIG. 4D and FIG. 5A to FIG. 5D, the search signal is often received through the interior antenna 20 at a timing earlier than it is received through the interior cable 10. In such cases, "YES" is determined in S215.

The search signal may be, however, received through the interior cable 10 at a timing earlier than it is received through the interior antenna 20 if the mobile terminal 2 is present in a location near the communication driver 16 in a case, for instance, described in FIG. 4A. In such cases, "NO" is determined in S215.

If "YES" is determined in S215, that is, if the mobile terminal 2 is present inside the cabin and the search signal has been received through the interior antenna 20 earlier than it has been received through the interior cable 10, the location of the mobile terminal 2 is detected (S216) by reference to a table A. In the table A, locations of the mobile terminal 2 relative to the path of the interior cable 10 are set in correspondence with time differences between when the signal is received through the interior antenna 20 and when it is received through the interior cable 10. As described above with reference to FIG. 4A to FIG. 4D and FIG. 5A to FIG. 5D, this correspondence can be obtained in advance.

Figures 10A, 10B, 10C:
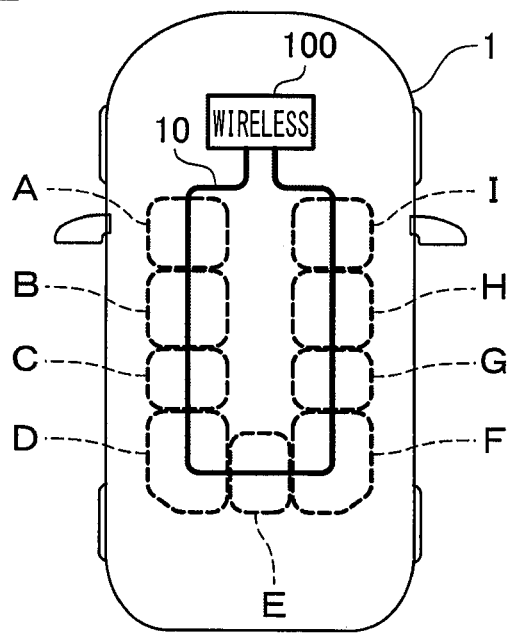
FIG. 10A is a diagram illustrating an example table to be referenced when the location of the mobile terminal is detected inside the cabin.
FIG. 10B is a diagram illustrating locations relative to the path of the interior cable which are divided into nine segments.
FIG. 10C is a diagram illustrating an example table to be referenced when the location of the mobile terminal is detected inside the cabin.

FIG. 10A is a diagram conceptually illustrating the table A described above. In FIG. 10A, locations relative to the path of the interior cable 10 are divided into nine segments, namely, a segment A to a segment I, and a time difference corresponding to each of the segments is set. In FIG. 10B, locations relative to the path of the interior cable 10 are divided into the nine segments, namely, the segment A to the segment I.

Although it is assumed here that locations relative to the path of the interior cable 10 are divided into nine segments, locations relative to the path may be divided into more segments and a time difference corresponding to each of the segments may be set.

If "NO" is determined in S215, that is, if the mobile terminal 2 is present inside the cabin and the search signal has been received through the interior cable 10 earlier than it has been received through the interior antenna 20, the location of the mobile terminal 2 is detected (S217) by reference to a table B. In the table B, locations of the mobile terminal 2 relative to the path of the interior cable 10 are set in correspondence with time differences between when the signal is received through the interior cable 10 and when it is received through the interior antenna 20.

FIG. 10C is a diagram conceptually illustrating the table B described above. The search signal is received through the interior cable 10 earlier than it is received through the interior antenna 20 in limited cases where the mobile terminal 2 is located in a small range near the communication driver 16 of the interior cable 10. The number of segments set in the table B is smaller than that of the table A commensurately with the small range.

The processing to determine the location of the mobile terminal 2 inside the cabin, which is performed when it is determined that the search signal is transmitted from inside the cabin (S214: YES), is described above.

When it is determined that the search signal has been transmitted from outside the cabin (S214: NO), the location of the mobile terminal 2 outside the cabin is determined in the following manner.

It is determined (S218) whether an exterior antenna through which the search signal has been received is the exterior antenna 21L on the left side. If the search signal has been received through the exterior antenna 21L on the left side (S218: YES), it is then determined (S219) whether the timing of reception of the search signal through the exterior antenna 21L is earlier than that through the exterior cable 11. As described above with reference to FIG. 6A to FIG. 6D and FIG. 7A to FIG. 7D, the search signal is often received through the exterior antenna 21L at a timing earlier than it is received through the exterior cable 11. In such cases, "YES" is determined in S219.

The search signal may be, however, received through the exterior cable 11 at a timing earlier than it is received through the exterior antenna 21L if the mobile terminal 2 is present in a location near the communication driver 16 of the exterior cable 11 (for example, in a location leftward and forward of the vehicle 1) in a case, for instance, described in FIG. 6A. In such cases, "NO" is determined in S219.

If "YES" is determined in S219, that is, if the mobile terminal 2 is present outside the cabin in a location on the left side of the vehicle 1 and the search signal has been received through the exterior antenna 21L earlier than it has been received through the exterior cable 11, the location of the mobile terminal 2 is detected (S220) by reference to a table C. In the table C, locations of the mobile terminal 2 relative to the path of the exterior cable 11 are set in correspondence with time differences between when the signal is received through the exterior antenna 21L and when it is received through the exterior cable 11. As described above with reference to FIG. 6A to FIG. 6D and FIG. 7A to FIG. 7D, this correspondence can be obtained in advance.

FIG. 11A is a diagram conceptually illustrating the table C described above. Although, in FIG. 11A, a range on the left side of the vehicle 1 relative to the path of the exterior cable 11 is divided into six segments and a time difference corresponding to each of the segments is set, the range may be divided into more segments and a time difference corresponding to each of the segments may be set.

If "NO" is determined in S219, that is, if the mobile terminal 2 is present outside the cabin in a location on the left side of the vehicle 1 and the search signal has been received through the exterior cable 11 earlier than it has been received through the exterior antenna 21L, the location of the mobile terminal 2 is detected (S221) by reference to a table D. In the table D, locations of the mobile terminal 2 relative to the path of the exterior cable 11 are set in correspondence with time differences between when the search signal is received through the exterior cable 11 and when it is received through the exterior antenna 21L.

FIG. 11B is a diagram conceptually illustrating the table D described above. The search signal is received through the exterior cable 11 earlier than it is received through the exterior antenna 21L in limited cases where the mobile terminal 2 is located in a small range leftward and forward of the vehicle 1. The number of segments set in the table D is smaller than that of the table C commensurately with the small range.

The processing to determine the location of the mobile terminal 2 on the left side of the vehicle 1, which is performed when it is determined that the search signal is received through the exterior antenna 21L on the left side (S218: YES), is described above.

If the search signal has been received through the exterior antenna 21R on the right side (S218: NO), the mobile terminal 2 is present outside the cabin on the right side of the vehicle 1. In this case, the search signal will not be received through the exterior cable 11 earlier than it is received through the exterior antenna 21R, as described above with reference to FIG. 6A to FIG. 6D and FIG. 7A to FIG. 7D. The location of the mobile terminal 2 is thus detected (S222) by reference to a table E, without determining whether the search signal has been received earlier through the exterior cable 11 or through the exterior antenna 21R. In the table E, locations of the mobile terminal 2 relative to the path of the exterior cable 11 on the right side of the vehicle 1 are set in correspondence with time differences between when the signal is received through the exterior antenna 21R and when it is received through the exterior cable 11.

FIG. 11C is a diagram conceptually illustrating the table E described above. Although, in also FIG. 11C, a range on the right side of the vehicle 1 relative to the path of the exterior cable 11 is divided into six segments and a time difference corresponding to each of the segments is set, the range may be divided into more segments and a time difference corresponding to each of the segments may be set.

After the location of the mobile terminal 2 inside the cabin or outside the cabin is detected (S216, S217, S220, S221, and S222) in relation to the path of the interior cable 10 or the exterior cable 11 as described above, the mobile-terminal location detection processing described in FIG. 8 and FIG. 9 are finished, and the wireless communication processing described in FIG. 3 is resumed.

As described above, the wireless communication apparatus 100 according to the present embodiment detects the location of the mobile terminal 2 inside or outside of the cabin of the vehicle 1, based on a difference in time when a radio wave is received, but not on a reception strength of the radio wave. The wireless communication apparatus 100 is not affected by attenuation of a radio wave, enabling sufficiently accurate detection of the location of the mobile terminal 2 without installing many antennas on the vehicle 1. For example, in the embodiment described above, the two leaky cables 10 and 11 (i.e., the interior cable 10 and exterior cable 11) installed in addition to the interior antenna 20 and the exterior antennas 21L and 21R on the left and right sides enable sufficiently accurate detection of the location of the mobile terminal 2 inside or outside the cabin.

The leaky cables 10 and 11 have a high degree of freedom in the layout of their paths and thus allow relatively arbitrary routing via locations where the detection of the mobile terminal 2 is desired. Additionally, the leaky cables 10 and 11 do not need to be laid via locations where the detection of the mobile terminal 2 is not needed because an occupant is not supposed to be located there, such as, for example, a center console.

The leaky cables 10 and 11 are thus laid via locations where the detection of the mobile terminal 2 is desired; additionally, a somewhat reduced sensitivity range may be set for the leaky cables 10 and 11 to prevent the leaky cables 10 and 11 from picking up radio waves in locations where the detection of the mobile terminal 2 is not needed. In this way, the location of the mobile terminal 2 where the detection is desired can be detected reliably; whereas the detection of the location of the mobile terminal 2 that is present in a range where the detection is not needed can be prevented. The accuracy with which the location of the mobile terminal 2 is detected can be thus enhanced.

(Modification)

A modification of the wireless communication apparatus 100 according to the present embodiment will be presented. A wireless communication apparatus 150 according to the modification is described in brief below, with a focus on differences from the wireless communication apparatus 100 according to the present embodiment described above.

In the wireless communication apparatus 100 according to the present embodiment described above, one end (also referred to as a first end) of each of the leaky cables 10 and 11 is coupled to the trailing-end resistor 17 while the other end (also referred to as a second end) of each of the leaky cables 10 and 11 is coupled to the communication driver 16. Radio waves received through the leaky cables 10 and 11 thus travel therethrough to the communication drivers 16 in any circumstances. The designations of the one end and the other end are used for convenience; the one end may also be referred to as the other end, and the other end may also be referred to as the one end.

The direction in which a radio wave received through the leaky cables 10 and 11 travels therethrough, however, may be switched as required.

Figure 12:
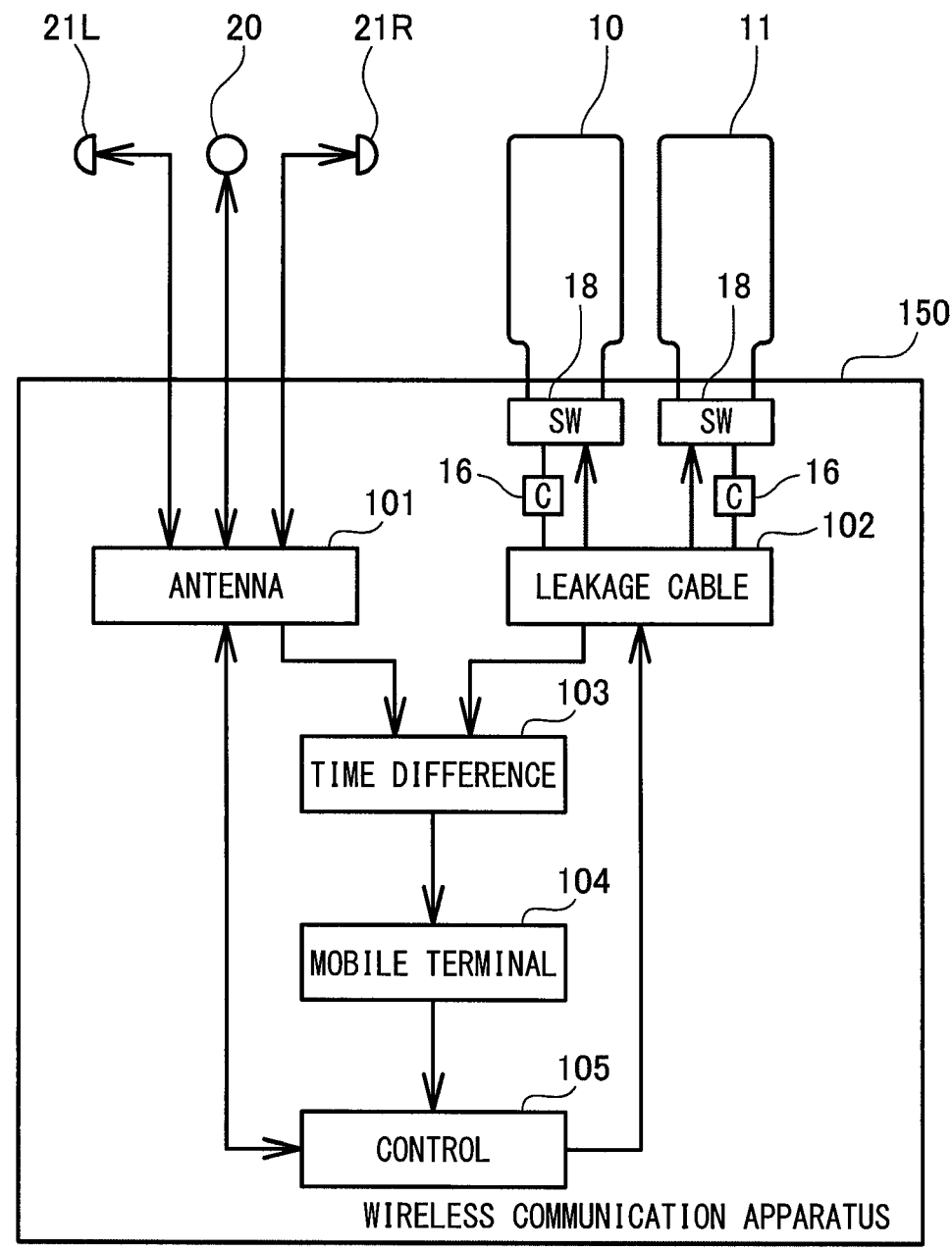
FIG. 12 is a block diagram of an inner structure of a wireless communication apparatus according to a modification.

FIG. 12 is a diagram illustrating a schematic inner structure of the wireless communication apparatus 150 according to the modification. The wireless communication apparatus 150 according to the modification is different from the wireless communication apparatus 100 according to the present embodiment described above with reference to FIG. 2 in that leaky cables 10 and 11 are each coupled to a communication driver 16 through a change-over switch 18. Other structural features are similar to those of the wireless communication apparatus 100 according to the present embodiment described above and are designated with identical symbols, and their description is omitted. The change-over switch 18 in the modification corresponds to a switching portion of the present disclosure.

Figure 13A:
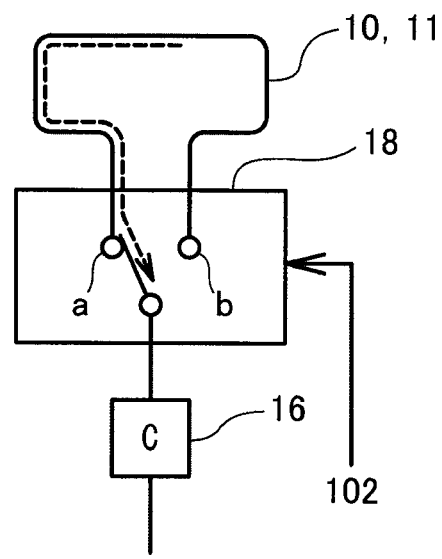
FIG. 13A is a diagram for describing an operation of a change-over switch included in the wireless communication apparatus according to the modification.
Figure 13B:
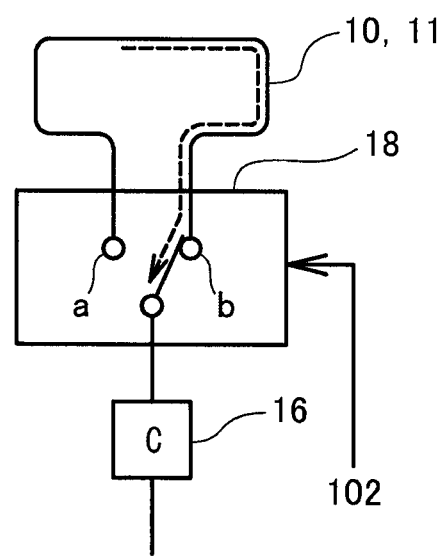
FIG. 13B is a diagram for describing an operation of the change-over switch included in the wireless communication apparatus according to the modification.

FIG. 13A and FIG. 13B are diagrams illustrating operations of the change-over switch 18 included in the wireless communication apparatus 150 according to the modification. The change-over switch 18 can switch between a state illustrated in FIG. 13A where the one end of the leaky cable 10 or 11 (an end "a" in the figures) is coupled to the communication driver 16 and the other end thereof (an end "b" in the figures) is decoupled from the communication driver 16 and a state illustrated in FIG. 13B where the other end of the leaky cable 10 or 11 (the end "b" in the figures) is coupled to the communication driver 16 and the one end thereof (the end "a" in the figures) is decoupled from the communication driver 16.

In the state illustrated in FIG. 13A, a radio wave received through the leaky cable 10 or 11 travels from an end "b" side to an end "a" side as marked with a broken line arrow. In the state illustrated in FIG. 13B, a radio wave travels from the end "a" side to the end "b" side as marked with a broken line arrow.

It is determined whether to select the state of FIG. 13A or the state of FIG. 13B under the control of a leaky-cable receiver 102.

Figure 14:
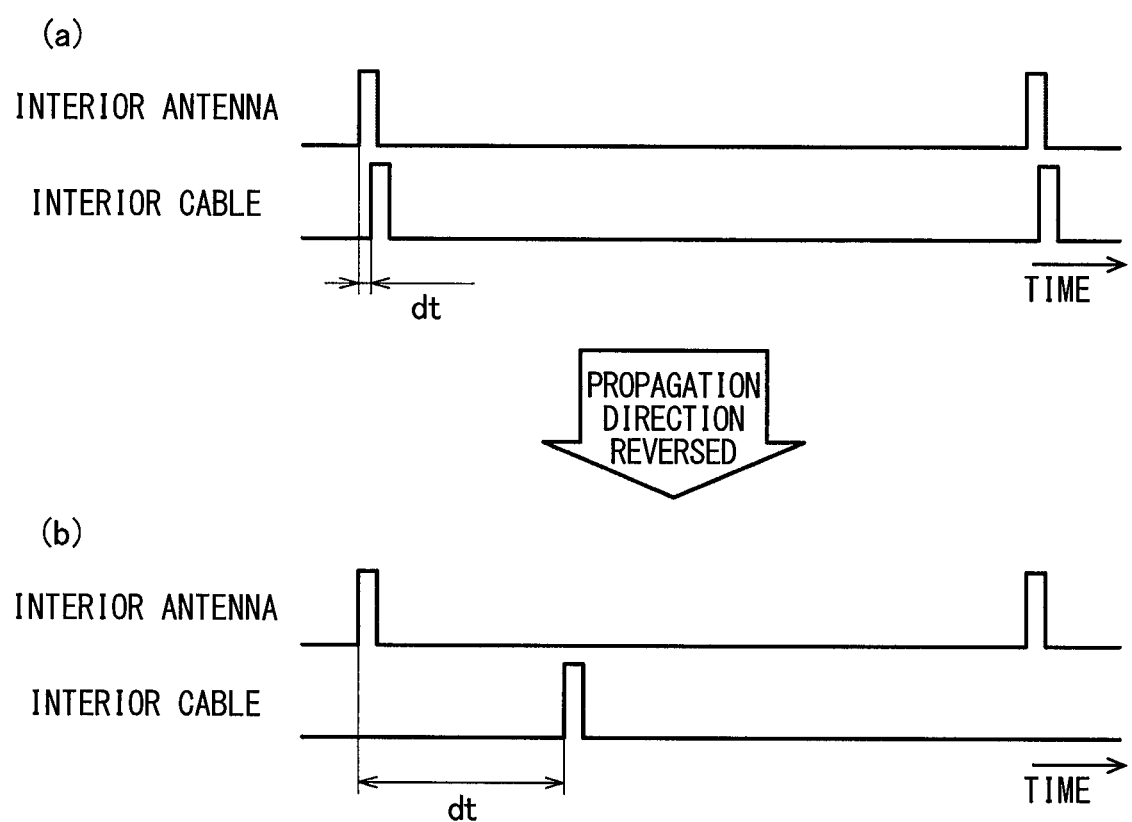
FIG. 14 is a diagram for describing how the wireless communication apparatus according to the modification switches the direction of coupling of a leaky cable.

The wireless communication apparatus 150 according to the modification may experience a situation as illustrated in, for example, a part (a) of FIG. 14 where the time difference between when a radio wave is received through an interior antenna 20 and when it is received through the interior cable 10 is small. This situation corresponds to the case where the distance over which the radio wave from the mobile terminal 2 travels through the interior cable 10 until it reaches the communication driver 16 is short. In such cases, the coupling state of the change-over switch 18 can be switched.

The direction in which the radio wave travels can be then reversed as described above with reference to FIG. 13A and FIG. 13B, which increases the distance over which the radio wave from the mobile terminal 2 travels through the interior cable 10 until it reaches the communication driver 16. This makes the time difference between when the radio wave is received through the interior antenna 20 and when the it is received through the interior cable 10 sufficient for accurate measurement of the time difference as illustrated in a part (b) of FIG. 14, enabling accurate detection of the location of the mobile terminal 2.

It is noted that a flowchart or the processing of the flowchart in the present application includes multiple steps (also referred to as sections), each of which is represented, for instance, as S100. Further, each step can be divided into several sub-steps while several steps can be combined into a single step.

Controllers and methods described in the present disclosure may be implemented by a special purpose computer created by configuring a memory and a processor programmed to execute one or more particular functions embodied in computer programs. Alternatively, the controllers and the methods described in the present disclosure may be implemented by a special purpose computer created by configuring a processor provided by one or more special purpose hardware logic circuits. Further alternatively, the controllers and the methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While various embodiments, configurations, and aspects of a mobile-terminal detection apparatus and mobile-terminal detection method according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A mobile-terminal detection apparatus that detects a location of a mobile terminal inside a vehicle cabin, the mobile terminal being capable of transmitting a radio wave wirelessly over air, the mobile-terminal detection apparatus comprising:
   an antenna receiver configured to directly receive, via an interior antenna disposed inside the vehicle cabin, the radio wave transmitted over the air;
   a leaky cable that encircles the vehicle cabin, the leaky cable configured to receive the radio wave and further transmit the radio wave through the leaky cable;
   a leaky-cable receiver configured to receive the radio wave transmitted through the leaky cable;
   a time difference detector that detects a time difference between a time when the radio wave is directly received over the air by the interior antenna and the antenna receiver and a time when the radio wave is received through the leaky cable by the leaky-cable receiver;
   a mobile-terminal detector that detects, based on the time difference, the location of the mobile terminal relative to a path over which the leaky cable is laid disposed; and
   a switching portion that switches between a first connection state where the leaky-cable receiver is coupled to a first end of the leaky cable and is decoupled from a second end of the leaky cable and a second connection state where the leaky-cable receiver is decoupled from the first end of the leaky cable and is coupled to the second end of the leaky cable.

2. The mobile-terminal detection apparatus according to claim 1, wherein: the leaky cable is disposed under each seat inside the vehicle cabin.

3. The mobile-terminal detection apparatus according to claim 1, wherein: the antenna receiver is further configured to directly receive, via an exterior antenna outside the vehicle cabin, the radio wave transmitted over the air; a different leaky cable disposed is outside the vehicle cabin, the different leaky cable configured to receive the radio wave and further transmit the radio wave through the different leaky cable; the leaky-cable receiver is further configured to receive the radio wave transmitted through the different leaky cable disposed outside the vehicle cabin; and the time difference detector is further configured to detect a time difference between a time when the radio wave is directly received over the air by the exterior antenna and the antenna receiver and a time when the radio wave is received through the different leaky cable by the leaky-cable receiver.

4. A mobile-terminal detection method for detecting a location of a mobile terminal inside a vehicle cabin, the mobile terminal being capable of transmitting a radio wave wirelessly over air, the mobile-terminal detection method comprising:

directly receiving, via an interior antenna disposed inside the vehicle cabin, the radio wave transmitted over the air;

receiving the radio wave transmitted through a leaky cable disposed inside the vehicle cabin;

detecting a time difference between a time when the radio wave is directly received by the interior antenna and a time when the radio wave is received through the leaky cable;

switching a coupling of the leaky cable between a first connection state and a second connection state;

directly receiving, via the interior antenna disposed inside the vehicle cabin, another radio wave transmitted over the air;

receiving the other radio wave transmitted through the leaky cable disposed inside the vehicle cabin;

detecting a time difference between a time when the other radio is directly received by the interior antenna and a time when the other radio wave is received through the leaky cable; and detecting, based on the time differences, the location of the mobile terminal relative to a path over which the leaky cable is disposed, wherein switching the coupling of the leaky cable transmits the radio wave from the mobile terminal in different directions within the leaky cable by switching between the first connection state and the second connection state.

5. A mobile-terminal detection apparatus comprising:

a processor connected with a memory, the processor being configured to:

directly receive a radio wave over air from a mobile terminal via an interior antenna disposed inside the vehicle cabin;

receive the radio wave through a leaky cable disposed inside the vehicle cabin;

detect a time difference between a time when the radio wave is directly received by the interior antenna and a time when the radio wave is received through the leaky cable;

switch a coupling of the leaky cable between a first connection state and a second connection state;

directly receive another radio wave over the air from the mobile terminal via the interior antenna disposed inside the vehicle cabin;

receive the other radio wave through the leaky cable disposed inside the vehicle cabin;

detect a time difference between a time when the other radio is directly received by the interior antenna and a time when the other radio wave is received through the leaky cable; and detect, based on the time differences, a location of the mobile terminal relative to a path over which the leaky cable is disposed, wherein switching the coupling of the leaky cable transmits the radio wave from the mobile terminal in different directions within the leaky cable by switching between the first connection state and the second connection state.

6. The mobile-terminal detection apparatus according to claim 1, wherein the first end and the second end of the leaky cable are connected to the mobile-terminal detection apparatus.

7. The mobile-terminal detection apparatus according to claim 1, wherein a transmission speed of the radio wave transmitted through the leaky cable is slower than a transmission speed of the radio wave transmitted over the air.

8. The mobile-terminal detection apparatus according to claim 7, wherein the time at which the radio wave is directly received by the interior antenna and the antenna receiver is when the antenna receiver receives the radio wave from the interior antenna after the mobile terminal transmits the radio wave over the air directly to the interior antenna, and wherein the time at which the radio is received through the leaky cable by the leaky-cable receiver is when the leaky-cable receiver receives the radio wave transmitted through the leaky cable after the mobile terminal transmits the radio wave and the radio wave is further transmitted through the leaky cable.

9. The mobile-terminal detection apparatus according to claim 1, wherein the leaky cable has a first end and a second end, the second end being opposite to the first end, and wherein the switching portion is further configured to transmit the radio wave from the mobile terminal in different directions within the leaky cable by switching between the first connection state and the second connection state.

10. The mobile-terminal detection apparatus according to claim 9, wherein the radio wave is a search signal that is transmitted from the mobile terminal at a predetermined cycle.

\* \* \* \* \*